United States Patent Office 3,149,060
Patented Sept. 15, 1964

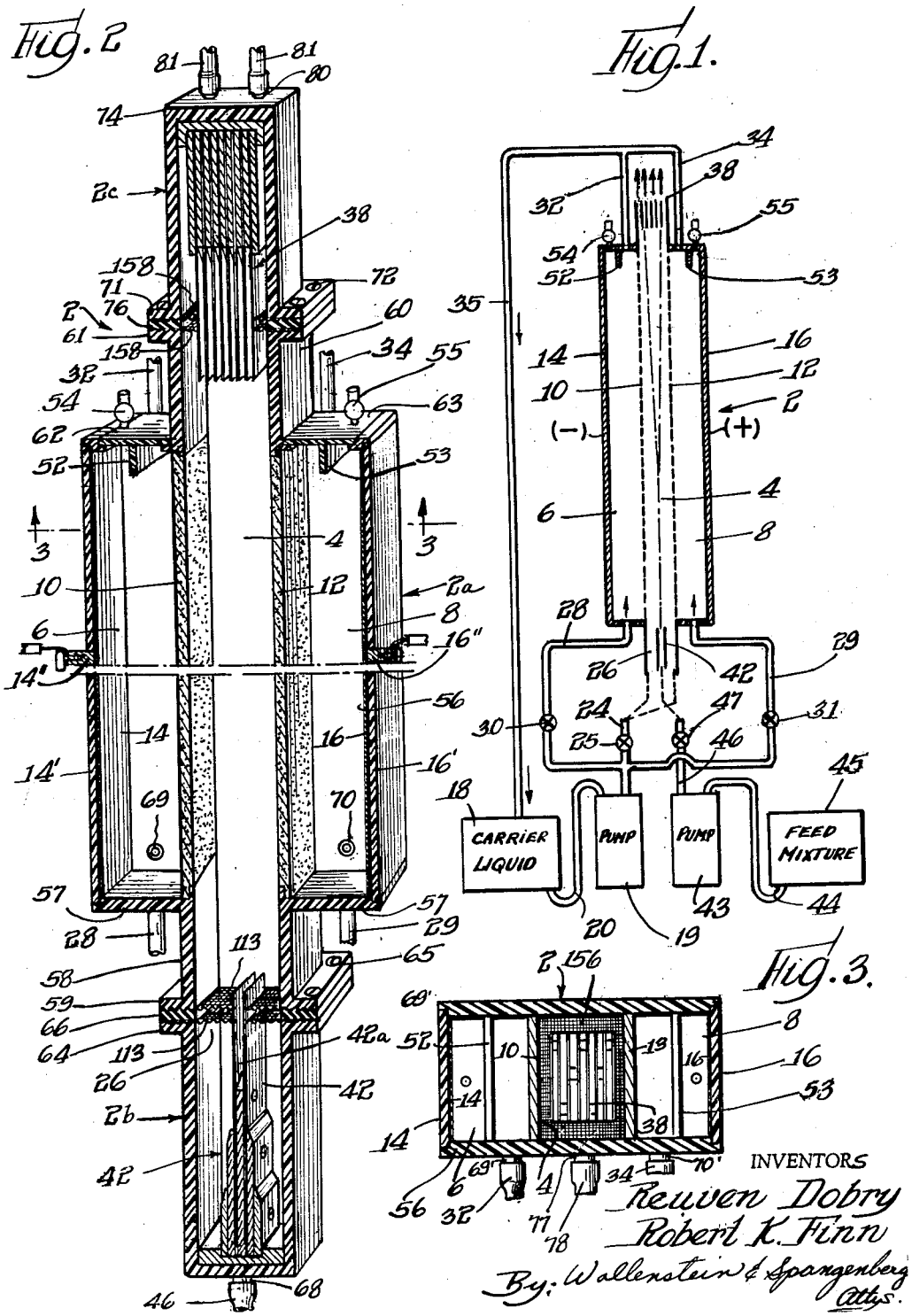

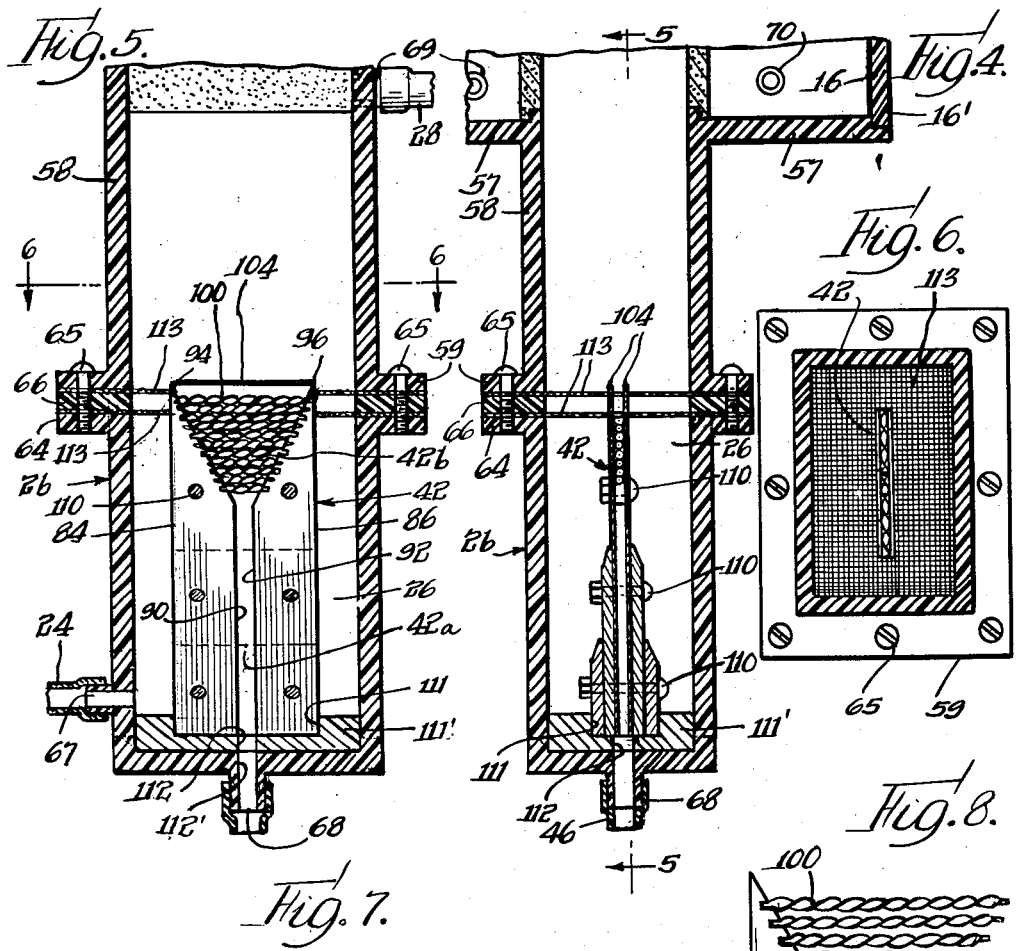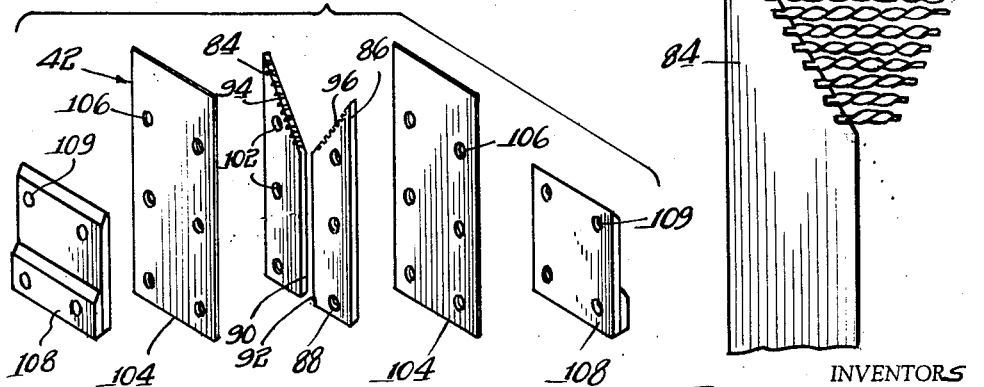

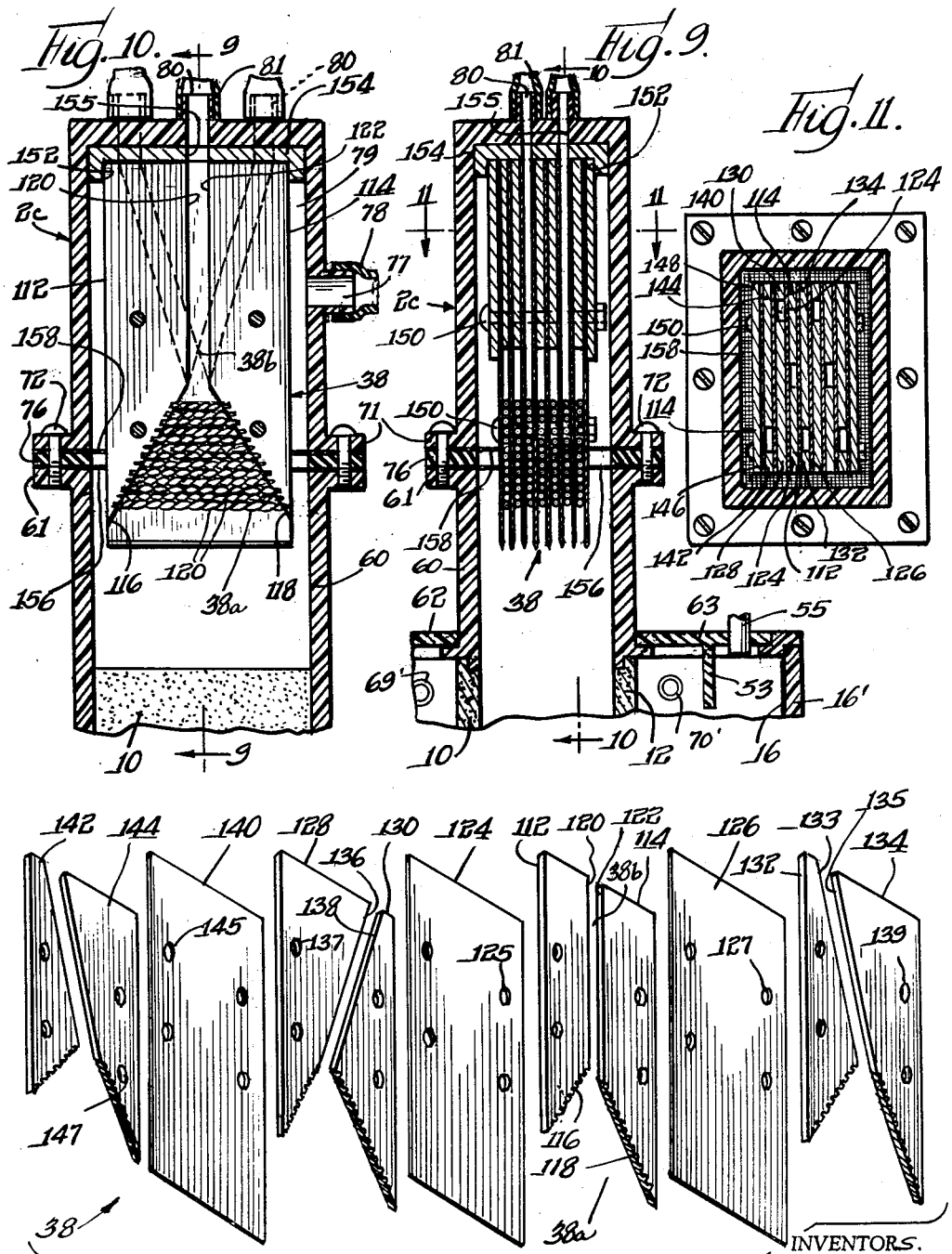

3,149,060
ELECTROPHORESIS METHOD AND APPARATUS
Reuven Dobry, Bakersfield, Calif., and Robert K. Finn, Ithaca, N.Y., assignors, by mesne assignments, to International Minerals & Chemical Corporation, Skokie, Ill., a corporation of New York
Filed Jan. 13, 1959, Ser. No. 786,506
17 Claims. (Cl. 204—180)

Electrophoresis is an electrokinetic phenomenon wherein charged particles in a liquid carrier medium migrate in an electric field in one direction or another parallel to the field, the amount of the migration being dependent upon the electrophoretic mobility of the particles, the strength of the field and the length of time the particles remain in the field. The factors which affect electrophoretic mobility are many, and include the size, shape and concentration of the charged particles, and the viscosity, pH and concentration of the carrier medium. Particles of similar electrophoretic mobility can thus be concentrated in distinct bands or layers when fed to electrophoresis apparatus. Electrophoretic techniques are particularly important because they perform separation of mixtures which are either chemically similar or too liable to be separated by any other method. Electrophoresis has been a powerful tool in the laboratory for separating dyes, proteins and amino acids, colloids and other complex mixtures of electrically charged particles. Other applications of electrophoresis are present in the fields of biology, pathology, physical chemistry and biochemistry, for instance, the analysis of physiological fluids such as blood sera and plasma, hemoglobin, egg and milk components and various tissue extracts. It is also an important means for isolating and testing the purity of pharmaceuticals, hormones, antigens and antibodies, venoms, viruses, enzymes, animal semen such as bull semen, and various polymers.

The various types of electrophoresis techniques heretofore used vary widely. Most of them involve batch treatment processes which are practical only on a laboratory scale. Large scale electrophoresis techniques should be continuous processes where the material which is fractionated is fed at appreciable rates continuously through the electrophoresis apparatus involved. The few continuous processes heretofore practiced leave much to be desired. For example, one such process separates only one component at a time, so that the feed mixture must be passed a number of times through the apparatus involved to separate the feed mixture into all of its components. The other continuous processes are unsatisfactory because they are inherently incapable of operating at high rates necessary for large scale operation.

A principal problem in electrophoresis separation is the remixing of partially separated fractions or layers by local density differences or thermal convection of the liquid as a whole. To cope with this problem, electrophoresis is often performed in solid anti-convection media, such as filter paper, starch, or glass powder. Unfortunately, such anti-convection solids present numerous disadvantages, among them being the reduction of capacity of the apparatus involved by their presence in the fractionation space, and their tendency to cut down the electrophoretic mobility of the particles as compared to their mobility in free liquid. Moreover, distortion and diffusion of the bands or filaments of the separated components often result from the use of such anti-convection media. Other complications stem from electroosmosis and adsorption effects.

Some of the heretofore used electrophoresis techniques depend upon convection transport by gravity by a liquid free of solid media, wherein thermal effects must be minimized by close temperature control and operation at a density near the maximum density of water. In large scale applications, the heat evolved by passage of current cannot be readily dissipated, and this makes large scale separation based on these techniques impractical.

It is, accordingly, an object of the present invention to provide an electrophoresis process and apparatus which overcome the aforesaid disadvantages. More specifically, one of the objects of the present invention is to provide a continuous electrophoresis method and apparatus which can fractionate at relatively high rates and wherein all of the components are separated in a single pass through the electrophoresis apparatus involved.

Another object of the present invention is to provide a continuous electrophoresis method and apparatus which do not use or require solid anti-convection media.

A still further object of the invention is to provide an electrophoresis method which can be carried out in relatively simple and rugged apparatus.

In accordance with one of the aspects of the invention, the mixture to be separated is introduced into the electric field as a single, narrow, horizontally elongated stream in an upwardly flowing body of carrier liquid maintained under forced laminar flow conditions. The longitudinal dimension of the stream is normal to the electric field. The carrier liquid preferably includes distilled water to which is added a water-soluble viscosity-imparting material, most advantageously an organic polymer having a long chain, fibrillar structure, although other viscosity-imparting materials which are soluble in the carrier medium involved to provide a homogeneous (single phase) system are encompassed in the broader aspects of the invention. Water held within the fibrillar structure of the long chain molecules of the organic polymer acts almost like free water, so that the electrophoretic mobility is not appreciably influenced by the presence of the polymer. As previously indicated, the viscosity of the carrier fluid minimizes distortion-producing convection currents or eddies which hinder the formation of distinct easily separated bands of the feed mixture components. The viscosity-imparting organic polymers should be essentially uncharged so that they have little or no electrophoretic mobility of their own. The viscosity-imparting materials may thus be such water-soluble polymers as dextran, polyvinyl alcohol, or methyl cellulose. Carboxymethyl cellulose is not so suitable because it has, under certain conditions, an electrophoretic mobility causing migration thereof to one side of the carrier fluid stream. A viscosity of approximately 10 centipoises or more, say up to several hundred centipoises, is highly satisfactory for various separations, as for separating dye mixtures at room temperature, the higher viscosities being used generally in connection with particularly difficult separations. Viscosity-imparting solutes of low molecular weight, such as glycerol or sucrose, are much less desirable than the long chain polymers because they reduce electrophoretic mobility. However, in some cases, these solutes are useful in electrophoretic separation.

The carrier liquid, in addition to the viscosity-imparting material, preferably also includes a small amount of buffered electrolyte. The presence of some electrolyte is, in some cases, necessary to maintain the mixture to be separated in solution in sufficiently high concentration, to preserve the identity of the medium with regard to its pH and ionic strength, and to minimize boundary anomalies due to differences in conductivity between the mixture to be separated and the carrier liquid. The amount of electrolyte is held to a minimum to minimize current flow in the carrier to reduce heating effects therein.

It is of utmost importance for most effective practice of the invention that laminar flow conditions be maintained to prevent remixing of partially or completely separated fractions. In addition to the use of a highly viscous carrier to this end, the upward direction of flow of the carrier liquid stream also helps to maintain laminar flow because convection currents caused by heating usually flow upwardly due to the decrease in density with increase in temperature of most liquids. Laminar flow conditions are difficult, if not impossible, to obtain where the direction of flow of convection currents run counter to the direction of forced flow of the carrier liquid. However, the broader aspects of the invention encompass introduction of the feed mixture, for example, in a downwardly continuous flowing stream of carrier liquid, particularly where water maintained in a temperature range of from 0 to 4° C. is used as the carrier medium since the density of water increases with temperature in this range causing convection currents to flow downwardly. In such case, however, the process conditions obviously must be stringently controlled to keep the carrier liquid within the narrow range of temperatures involved, and is, therefore, a decidedly less preferred form of the invention. Also, although for large scale applications requiring high feeding rates, the feed mixture should be introduced as an elongated stream, in accordance with a broad aspect of the invention, a small circular or square feed mixture stream would be satisfactory where only small scale operation is desired.

The process of the present invention is preferably carried out in a cell having three juxtaposed vertical flow chambers, the outermost chambers containing electrodes for producing the electric field and the central chamber being the separation compartment in which feed mixture to be separated is introduced. The walls separating the central separation chamber from the outermost electrode chambers are most advantageously made of rigid, porous insulating material where the porosity is such that the walls are highly permeable to ionic current flow but prevent bulk flow therethrough for small pressure differences. For example, the porous walls may be an acrylic resin such as Flexolith (marketed by Filtros, Inc., of East Rochester, New York), having a mean pore size of from 8 to 15 microns. These porous walls are superior to semi-permeable membranes such as cellophane which is a weak material. The porous walls are made of a non-conductive material because, with use of walls of conductive material, the latter act as electrodes with generation of gases thereat which adversely affect the pH and laminar flow conditions in the central separation chamber.

Bulk flow through the aforesaid porous walls is undesirable from a number of standpoints. In the first place, it creates eddies in the central chamber which distort the separation bands. In the second place, it may result in the carrying of gaseous products of electrolysis in the outermost electrode chambers into the central separation chamber with the disadvantages mentioned above. To prevent a build-up of gases in the outermost chambers, means are provided for continuously removing the gases from the outermost chambers.

The carrier liquid is introduced into the bottoms of all three chambers and the fluid velocity and pressure thereof at the various corresponding points of the chambers are approximately the same. The mixture to be separated is introduced into the center portion of the central chamber where the feed mixture stream is spaced from all of the walls of the central chamber, to provide as flat a velocity profile as possible, so that the residence time in the electric field of the various points of the feed mixture stream is approximately the same. As previously indicated, the degree of electrophoretic migration is a function of such residence time.

The feed mixture to be separated is most advantageously introduced through a knife-edged feed duct having means therein for evenly distributing the mixture throughout the width of the duct. This means preferably includes a series of closely spaced spiralled strips of material extending across the duct. Carrier liquid is introduced around this feed duct in the central chamber and turbulence thereof is minimized by passing the carrier liquid through spaced screens.

The separate components of the feed mixture are most advantageously removed from the central chamber through a series of knifed-edged outlet ducts placed side by side in the direction of the electric field. However, in accordance with a broader aspect of the invention, other means may be used to introduce and remove the feed mixtures from the cell.

Other objects, advantages and features of the present invention will become apparent upon reference to the specification to follow, the claims and drawings wherein:

FIG. 1 is a diagrammatic view of an electrophoresis cell illustrating the basic process and apparatus aspects of the present invention;

FIG. 2 is a longitudinal sectional view through an exemplary form of the cell diagrammatically illustrated in FIG. 1;

FIG. 3 is a transverse sectional view through the cell of FIG. 2, taken along section line 3—3 therein;

FIG. 4 is an enlarged longitudinal sectional view through the inlet end of the cell shown in FIG. 2;

FIG. 5 is an enlarged longitudinal sectional view of the inlet end of the cell shown in FIG. 2, as seen along section line 5—5 in FIG. 4;

FIG. 6 is an enlarged transverse sectional view through the inlet end of the cell shown in FIG. 2, taken along section line 6—6 in FIG. 5;

FIG. 7 is an exploded view of the various elements making up the inlet feed duct;

FIG. 8 is an enlarged view of one of the duct-forming plates making up the duct assembly shown in FIG. 7;

FIG. 9 is an enlarged longitudinal sectional view through the outlet end of the cell shown in FIG. 2, showing particularly the construction of the outlet duct assembly;

FIG. 10 is an enlarged longitudinal sectional view of the outlet end of the cell shown in FIG. 2, as seen along section line 10—10 in FIG. 9;

FIG. 11 is an enlarged transverse sectional view through the outlet end of the cell shown in FIG. 2, taken along section line 11—11 in FIG. 9; and FIG. 12 is an exploded view of part of the outlet duct assembly.

*General Description (FIG. 1)*

Referring now to FIG. 1, the cell for carrying out the process of the present invention includes a hollow cell body 2 divided into three juxtaposed vertical flow chambers 4, 6 and 8. The central chamber 4, which will be referred to sometimes as a separation chamber, is separated from the left hand chamber 6 by a porous wall 10 and from the right hand chamber 8 by a porous wall 12. As previously indicated, each of the porous walls 10 and 12 is preferably made of a non-conductive material which is sufficiently porous to provide high ionic electrical conductivity, but not so porous as to permit the flow of liquid in bulk between the central and the outermost chambers at small pressure differences. An illustrative material found especially satisfactory, as indicated previously, is an acrylic resin having a mean pore size of from 8 to 15 microns. Except for the outermost side walls of the outermost chambers 6 and 8, the other defining walls of the chambers are made of an insulating material, such as Lucite. The outermost side walls of the outermost chambers, identified by reference numerals 14 and 16, are, suitably, made of a conductive material such as metal and form electrodes which are respectively connected to the oppositely polarized terminals of a source of suitable direct current potential. The actual potential to be used depends upon the particular size and requirements of the cell, but, as an example of a large scale cell, the voltage supply may have an output of several hundred volts. The positive or anode electrode 16 is preferably made of or coated with noble metal, since noble metals are not subject to deterioration by electrolytic oxidation. The negative or cathode electrode 14 may be made of stainless steel or carbon.

An upward laminar flow of a viscous carrier liquid is provided in the three flow chambers 4, 6 and 8 which carrier liquid is carried to the cell from a suitable reservoir 18 by a pump 19. A conduit 20 extends from the bottom of the reservoir 18 to the inlet side of the pump 19. A conduit 24 having a flow rate control valve 25 connects the outlet end of the pump to an annular space 26 at the bottom of the central separation chamber 4, and conduits 28 and 29 having rate control valves 30 and 31, respectively, connect the outlet end of the pump 19 to the bottom end of the outermost flow chambers 6 and 8. Return conduits 32 and 34 connected to the upper ends of the flow chambers return the carrier liquid from these chambers through a common conduit 35 back to the reservoir 18. Some or all of the carrier liquid in the central separation chamber 4 may be removed, along with the separated components of the feed mixture, by a flow splitter and outlet duct assembly 38.

The feed mixture is introduced into the bottom and center of the separation chamber 4 at approximately the same velocity as the carrier liquid through an inlet feed duct 42. The mouth of the duct 42 is elongated horizontally in a direction at right angles to the electric field developed between the electrode plates 14 and 16. Both the inlet duct 42 and outlet duct assembly are most advantageously knife-edged ducts to be described in connection with the preferred exemplary embodiment of FIGS. 2–12, but, in its broader aspects, the invention contemplates the use of other means for introducing the feed mixture into and removing the same from the cell. For example, where only small scale operation is desired, the means for introducing the feed mixture into the cell could be a fine needle or capillary duct which introduces a small feed stream of circular cross section.

The feed mixture is fed through the duct 42 by a pump 43 whose inlet is connected via a conduit 44 to a reservoir 45 containing the feed mixture and whose outlet is connected by a conduit 46 containing a flow rate control valve 47 to the inlet side of the feed duct 42. The margins of the mouth of the feed duct 42 are spaced appreciably from all of the defining walls of the central chamber 4, so that the feed mixture occupies only a central column within the separation chamber 4.

As previously indicated, the various particle types making up the mixture migrate toward one side or the other of the center of the separation chamber, depending upon the sign of the charge of the particles, the degree of the migration at any point in the chamber being a function of the electrophoretic mobility of the particles and the residence time in the electric field between the electrodes 14–16. Particles of a similar type will be bent to the same degree so that all similar particles end up in a similar band spaced essentially the same distance from the center line of the separation chamber.

The outlet duct assembly preferably has a series of duct mouths horizontally elongated in the same direction as the mouth of the inlet duct 42, and positioned in side by side relation in the direction of the electric field. In this manner, the various separated streams will be removed from the central chamber through separate ducts.

The capacity of the apparatus is related to the dimensions of the horizontally elongated stream of the feed mixture fed from the duct 42. This stream maintains its original shape as long as the fractionation is confined to the central portion of the column where the velocity profile is fairly uniform. If the feed stream is too wide, however, it may extend into a region where the local velocity is appreciably different from the velocity at the core of the column, due to the frictional drag of the walls of the separation chamber. This would, of course, result in different retention times of similar particles along the width of the feed mixture stream with consequent nondistinct or intermixed separation bands.

If the feed stream is too thin, it is dragged along by viscous forces in the flowing carrier liquid, and if too thick it acts more like a slug of different liquid. Then it tends to rise or settle in the carrier liquid depending on the prevailing density differences. Since this effect is superimposed on the general flow pattern, it can lead to complications. In extreme cases it may even distort and destroy the continuity of the separate bands of the separated particles. In one typical embodiment of the cell illustrated, excellent results were obtained for a feed mixture of basic fuchsin, bromthymol blue, and bromphenol blue where the separation chamber 4 was a 3 x 2 inch rectangular section, the long dimension being at right angles to the direction of the electric field, the mouth of the inlet feed duct centered in the separation chamber was 40 mm., and the viscosity of the carrier liquid was 10 centipoises.

The generation of gases in the electrode chambers 6 and 8 may, in certain instances, cause trouble if the gases are carried into the separation chamber 4, since this tends to upset the flow and may alter the pH conditions in the separation chamber. Therefore, unless the operation of the electrophoresis cell is designed to provide reversible electrode reactions, it is desirable that some means be provided for carrying away the gases generated in the electrode chambers. To this end, gas trap-forming walls 52 and 53 are provided across the upper ends of the electrode chambers in spaced parallel relation to the electrodes 14 and 16 for forming pockets which trap the gases. The pockets are vented by any suitable means, such as by gas relief valves 54 and 55, respectively.

The nature of the flow pattern inside the separation chamber of the electrophoresis cell plays an important role in achieving satisfactory large scale continuous electrophoresis because of the necessity for maintaining an essentially steady and reproducible pattern of laminar flow if the full advantages of the invention are to be obtained. Reference should, therefore, now be made to the exemplary cell shown in FIGS. 2–12 which includes various features providing, among other things, proper flow conditions within the cell.

*Exemplary Embodiment of FIGS. 2–12*

Referring now more particularly to FIGS. 2 and 3, the electrophoresis cell 2 there shown includes a hollow insulating body structure made of Lucite or other similar preferably transparent organic plastic material. It includes a central section 2a having a wide portion with opposite vertical side walls 56—56 extending the width and length of the three chambers 4, 6 and 8. Coplanar horizontal walls 57—57 extending between the side walls 56—56 define the bottoms of the electrode chambers 6 and 8. The wide portion of the central body section 2a is open at the sides thereof and the open sides are enclosed by the electrodes 14 and 16. The electrodes 14 and 16 may constitute conductive inner linings or coatings on the inside surfaces of rectangular plates 14′ and 16′ made of insulating plastic material, such as Lucite, forming outermost side walls cemented or otherwise connected in liquid sealing relation across the side margins of the side walls 56—56. Exposed electrical connecting terminals 14″ and 16″ are respectively embedded within the insulating plates 14′ and 16′ and make electrical connection with the conductive electrode-forming linings or coatings 14 and 16. The use of insulating plastic plates 14′ and 16′ is desirable since an effective plastic to plastic seal effected between plates 14′ and 16′ and side walls 56—56 is more easily accomplished than a metal to plastic seal required if the electrodes were made entirely of metal, and the safety hazard of extensive exposed electrode surfaces is eliminated.

The porous walls 10–12 are made of rectangular pieces of Flexolith or similar material which bridge intermediate portions of the side walls 56—56 to form central and outermost rectangular flow chambers 4, 6 and 8 of approximately the same dimensions. The bottom of the central body section has a depending rectangular neck 58 forming a continuation of the central flow chamber 4, the neck terminating in an external flange 59. The top of the central body section has an upwardly extending rectangular neck 60 forming a continuation of the central flow chamber 4, the neck portion terminating in a flange 61. The Lucite body structure is open at the sides of the bottom of the neck 60 and these openings are covered by cover plates 62 and 63 which carry the dependent gas trap-defining walls 52 and 53 and the aforesaid gas vent valves 54 and 55.

The insulating body structure has attached to the bottom flange 59 thereof a rectangular lower end section 2b made of Lucite or similar transparent plastic material and which forms a continuation of the central flow chamber 4. The bottom end section has a top external flange 64 which is secured by screws 65 to the flange 59 of the central body section 2a. A sealing gasket 66 is sandwiched between the flanges 59 and 64. The bottom end section 2b has nipples 67 (FIG. 5) and 68 which receive the ends of inlet conduits 24 and 46, respectively. The side walls 56—56 of the central body section 2a have similar nipples 69 and 70 opposite the bottoms of the outermost chambers 6 and 8 for receiving the ends of inlet conduits 28 and 29 and nipples 69' and 70' opposite the tops of the outermost chambers for receiving the return conduits 32 and 34.

The insulating body structure has attached to the upper flange 61 a hollow, open-bottom rectangular upper end section 2c made of Lucite or similar material and which forms a continuation of the central flow chamber 4. The end section has a bottom external flange 71 which is secured by screws 72 to the flange 61. A sealing gasket 76 is sandwiched between the flanges 61 and 71. The end section 2c has a nipple 77 in one of its side walls (FIG. 10) for receiving the ends of a return conduit 78 which may convey carrier liquid in an annular space 79 in the upper end of the central chamber 4 to the common return conduit 35 (FIG. 1). The top wall of the end section 2c has a series of nipples 80 which receive the ends of conduits 81 to be connected to the aforesaid outlet ducts in the top of the central chamber 4.

The inlet and outlet ducts 42 and 38 which carry the feed mixture and the separated components thereof, respectively, to and from the central chamber are mounted respectively within the lower and upper end sections 2b and 2c. Referring now to FIGS. 4–8 which show the construction of the inlet duct 42, as previously indicated, the inlet duct is specially designed to provide a thin, horizontally elongated stream of feed mixture evenly distributed throughout its width. As will appear, it has knife-edges to provide a minimum of interference with the laminar flow of the carrier liquid through the annular space 26 surrounding the duct 42. To this end, the duct 42 comprises an assembly of plate-like elements shown most clearly in the exploded view of FIG. 7. The duct passage defined thereby has a narrow bottom inlet section 42a and an upwardly flaring outlet section 42b. These duct passage sections are defined by a pair of spaced duct plates 84–86 made of Lucite or other material. The duct plates are complementary in shape and have confronting spaced vertical side edges 90 and 92 spaced apart to form the narrow inlet section 42a and upwardly and outwardly inclining confronting edges 94 and 96 defining the outlet section 42b of the duct passage. The inclined edges 94 and 96 are slotted as shown most clearly in FIG. 8 to provide sockets for the ends of twisted strips 100 of material, for example, made of stainless steel, extending across the tapered outlet duct section 42b. The strips 100, for example, may each be 45 degree spirals of 7 to 8 turns per inch. These spiral strips may be placed as close as 1/8 inch apart, although their exact size and spacing may vary widely. These strips aid in evenly distributing the feed mixture across the mouth of the duct. Otherwise, the inlet stream of feed mixture may concentrate itself in the center portion of the duct mouth.

The duct plates 84 and 86 are preferably coated or covered with a layer of rubber-like material and are provided with bolt-receiving holes 102. The duct plates are sandwiched between knife-edged stainless steel plates 104—104 which are longer than the duct plates so as to extend upwardly beyond them a small amount as shown most clearly in FIGS. 4 and 5. The stainless steel plates have bolt-receiving holes 106 corresponding to the holes 102 in the duct plates. A pair of end plates 108—108, coated or covered with a rubber-like material, are applied on the outside of the stainless steel plates 104—104. The end plates 108—108 have bolt-receiving holes 109 corresponding to the bolt-receiving holes in the lower portion of the stainless steel plates 104—104 and the duct plates 84–86. The entire assembly of the various plates is clamped together by nuts and bolts 110 passing through the aforesaid bolt-receiving holes of the plates.

The feed duct assembly just described may be press fitted or otherwise secured within an opening 111 in a base block 111' which is screwed or otherwise secured to the bottom wall of lower end section 2b. The various rubber-like coatings of the duct plates and the end plates provide liquid-tight seals between the various plates. An inlet hole 112 is provided in the bottom of the block 111' which overlies a similar hole 112' formed in the bottom of the end section 2b. The inlet duct assembly 42 occupies only the central portion of the end section 2b and the carrier liquid enters the annular space 26 around the duct assembly through the nipple 67.

To distribute the carrier liquid evenly around the feed duct 42, a pair of fine mesh screens 113 is positioned around the feed duct assembly 42 as shown most clearly in FIGS. 4–6. These screens may be 100 mesh screens spaced 1/8 inch apart. The marginal portions of these screens are respectively sandwiched between the opposite faces of gasket 66 and flanges 59 and 64.

Reference should now be made more particularly to FIGS. 9–12 showing various details of the outlet duct assembly 38 supported in the upper end section 2c. As there shown, the outlet duct assembly comprises a series of plates forming duct passages each having a downwardly flaring inlet section 38a and a relatively narrow outlet section 38b. The outlet sections of the various ducts extend at various angles so as to distribute the outlet openings of these ducts, as shown most clearly in FIG. 11.

As shown in FIG. 12, the centermost duct passages are each defined by a pair of duct plates 112–114 made of Lucite or other material and have oppositely inclined spaced confronting edges 116–118 which are slotted as the duct plates previously described to provide sockets which receive spiralled stainless steel strips 120 of a similar size and spacing to the stainless steel strips 100 previously described. The duct plates 112–114 also have spaced vertical confronting edges 120–122 defining the narrow upper duct section 38b. The duct plates 112–114 are coated with a rubber-like material and are sandwiched between a pair of rectangular knife-edged stainless steel plates 124–126 which are longer than the duct plates 112–114 so that they extend beyond the bottom of the duct plates as shown most clearly in FIGS. 9 and 10. The plates 124 and 126 have bolt-receiving holes 125 and 127 respectively. On the outside of each of the stainless steel duct plates like 124–126 are respective pairs of inclined edged duct plates 128–130 and 132–134. The duct plates 128–130 are similar to the duct plates 112–114 just described except that the former plates have parallel inclined spaced confronting edges 136–138 forming a narrow outlet passage section which inclines to the right of a vertical center line as viewed in FIG. 12 while the latter duct plates 132–134 have parallel inclined confronting edges 133–135 forming a narrow outlet passage section which inclines to the left of the vertical center line. The duct plates 128–130 are provided with bolt-receiving holes 137 and duct plates 132–134 are provided with bolt-receiving holes 139.

To the left of the duct plates 128–130 is a knife-edged rectangular plate 140 similar to the knife-edged plate 124, and to the left of the stainless steel plate 140 is a pair of duct plates 142–144 identical to the duct plates 132–134. The plate 140 has bolt-receiving holes 145 and the plates 142 and 144 have bolt-receiving holes 147. A knife-edged plate 146 having similar bolt-receiving holes (FIG. 11) is placed over the left side of the duct plates 142–144 and an end plate 148 also having bolt-receiving holes is positioned to the left of the knife-edged plate 146.

The remainder of the duct plate assembly to the right of the duct plates 133–135 is constructed in the same way as that portion just described and thus comprise the alternate placement of duct plate pairs and knife-edged plates having the various outlet duct passages shown in FIG. 11. The entire duct assembly is clamped together by bolts and nuts 150 passing through various bolt-receiving holes in the plates making up the assembly. The entire assembly may be press fitted or otherwise mounted within a recess 152 in a rectangular mounting block 154 screwed or otherwise secured to the upper wall of the upper end section 2c. The mounting block 154 has a series of holes 155 which are in registry with the holes of the various nipples 80 formed in the top wall of the upper end section 2c.

A pair of fine mesh screens 156 and 158, which may be 100 mesh screens spaced ⅛ inch apart, are positioned around the duct assembly 38. The marginal portions of these screens are respectively sandwiched between the opposite faces of gasket 76 and flanges 61 and 71.

*Exemplary Conditions of Operation*

The following conditions of operation of the electrophoresis cell were utilized in the separation of a dye mixture consisting of basic fuchsin, bromthymol blue, and bromphenol blue where the length of the electric field (i.e. the height of the electrodes 14 and 16) was 40 inches.

Average flow rate _____ 2.9 mm./sec.
Feeding rate of dye mixture _____ 5 ml./min.
Field strength _____ 6 volts/cm.
Current density _____ $3.5 \times 10^{-4}$ amp./cm.$^2$.
Carrier liquid: Distilled water in which is dissolved 0.3% of 4,000 c.p.s. methyl cellulose (viscosity-imparting agent) and 0.00025 M acetate buffer electrolyte.
Viscosity of carrier liquid _____ 10 c.p.s.
pH of carrier liquid _____ 5.2.
Temperature of carrier liquid _____ 24° C.
Conductivity of carrier liquid _____ $5.5 \times 10^{-5}$ ohm$^{-1}$ cm.$^{-1}$.

The dye mixture split up into distinct bands which appear red, yellow and blue, respectively, on color slides. The spacing between the centers of the color bands was 7 mm. between the red and yellow bands and 3 mm. between the yellow and blue bands.

It should be understood that numerous variations may be made of the various process conditions and constructional details of the cell without deviating from the broader method and apparatus aspects of the invention.

What we claim as new and desire to protect by Letters Patent of the United States is:

1. A process for separating charged particles in a vertical flow chamber by electrophoresis comprising: vertically introducing at the lower part of said chamber a body of carrier liquid and flowing the same vertically upwardly in the form of an elongated stream under forced laminar flow conditions; vertically introducing, at a lower part of said chamber only in the central portion of said flowing carrier liquid, the mixture of charged particles to be separated and flowing the same vertically upwardly with said carrier liquid; maintaining said upwardly vertical flow while applying a horizontal electric field at right angles to the longitudinal axis of said vertically elongated flowing stream to form horizontally spaced bands of charged particles in accordance with their electrophoretic mobilities; and separately removing the resulting separated bands of particles at the upper part of said chamber before said bands of particles have reached the vertical walls of said chamber.

2. A process in accordance with claim 1, wherein the carrier liquid is one in which the density thereof decreases with rise in temperature.

3. A process in accordance with claim 1, wherein the viscosity of the carrier liquid is increased by the incorporation thereinto of an uncharged organic polymer having a fibrillar structure.

4. A process in accordance with claim 1, wherein the carrier liquid is water which has been rendered viscous by the incorporation thereinto of an uncharged viscosity-imparting organic polymer having a fibrillar structure.

5. A process for separating charged particles in a vertical flow chamber by electrophoresis comprising: vertically introducing at the lower part of said chamber a body of carrier liquid rendered viscous by the incorporation thereinto of an essentially uncharged thickening agent to produce a viscosity of at least 10 centipoises and flowing the same vertically upwardly in the form of an elongated continuous stream under forced laminar flow conditions; vertically introducing, at a lower part of said chamber only in the central portion of said flowing carrier liquid, the mixture of charged particles to be separated and flowing the same vertically upwardly with said carrier liquid; maintaining said upwardly vertical flow while applying a horizontal electric field at right angles to the longitudinal axis of said vertically elongated flowing stream to form horizontally spaced bands of charged particles in accordance with their electrophoretic mobilities; and separately removing the resulting separated bands of particles at the upper part of said chamber before said bands of particles have reached the vertical walls of said chamber.

6. Electrophoresis apparatus for separating charged particles comprising: three juxtaposed vertical flow chambers separated by walls made of a rigid porous material which is permeable to flow therethrough of ionic current but which prevents bulk flow therethrough, the outermost flow chambers having oppositely polarized vertical plates of electrically conductive material comprising electrodes providing a transverse electric field therebetween, said vertical plates constituting essentially the outermost walls of each of said outermost flow chambers, carrier feed means at the bottom of said chambers providing a vertically upward forced laminar flow of a carrier liquid through each of said chambers in the same direction as the flow of heat convection currents in the liquid, inlet duct means at the central portion of the bottom of the central chamber for introducing into the laminar flowing carrier liquid a mixture of particles to be fractionated in a narrow horizontally elongated stream spaced from all the walls of the central chamber, the direction of elongation of said stream being normal to said electric field, and outlet duct means at the top of the central chamber for removing the separated particles from the laminar flowing carrier liquid and comprising a number of ducts positioned side by side in the direction of said electric field.

7. Electrophoresis apparatus for separating charged particles comprising: three juxtaposed vertical flow chambers separated by walls made of a material which is permeable to flow therethrough of ionic current but which prevents bulk flow therethrough, the outermost flow chambers having oppositely polarized vertical plates of electrically conductive material comprising electrodes providing a transverse electric field therebetween, said vertical plates constituting essentially the outermost walls of each of said outermost flow chambers, carrier feed means at the bottom of said chambers providing a vertically upward forced laminar flow of a carrier liquid through each of said chambers in the same direction as the flow of heat convection currents in the liquid, inlet knife-edged duct means at the central portion of the bottom of the central chamber for introducing into the laminar flowing carrier liquid a mixture of particles to be fractionated in a stream spaced from all the walls of the central chamber, and outlet duct means at the top of the central chamber for removing the separated particles from the laminar flowing carrier liquid and comprising a number of knife-edged ducts positioned side by side in the direction of said electric field.

8. Electrophoresis apparatus for separating charged particles comprising: three juxtaposed vertical flow chambers separated by walls made of a material which is permeable to flow therethrough of ionic current but which prevents bulk flow therethrough, the outermost flow chambers having oppositely polarized vertical plates of electrically conductive material comprising electrodes providing a transverse electric field therebetween, said vertical plates constituting essentially the outermost walls of each of said outermost flow chambers, carrier feed means at the bottom of said chambers providing a forced vertically upward laminar flow of a carrier liquid through each of said chambers, elongated inlet duct means at the central portion of the inlet end of the central chamber for introducing vertically upwardly a mixture of particles to be fractionated in a narrow horizontally elongated stream spaced from all the walls of the central chamber, the direction of elongation of said stream being normal to said electric field, means for distributing the flow of said mixture evenly through said inlet duct means comprising spiralling strips of material extending across the inlet duct means, and outlet means at the outlet end of the central chamber for removing the separated particles and comprising a number of ducts positioned side by side in the direction of said electric field.

9. Electrophoresis apparatus comprising: three juxtaposed vertical flow chambers separated by rigid, porous walls made of non-conductive material which is permeable to flow therethrough of ionic current but which prevents bulk flow therethrough, the outermost flow chambers having oppositely polarized vertical plates of electrically conductive material comprising electrodes providing a transverse electric field therebetween, said vertical plates constituting essentially the outermost walls of each of said outermost flow chambers, means for removing gaseous electrolytic products from said outermost chambers, carrier feed means providing vertically upward forced laminar flow of a carrier liquid through each of said chambers in the same direction as the flow of heat convection currents in the liquid, inlet duct means at the center and inlet end of the central chamber for introducing a mixture to be fractionated spaced from all the walls of the central chamber, and outlet duct means at the outlet end of the central chamber for removing the separated mixture particles from the laminar flowing carrier liquid and comprising a number of ducts positioned side by side in the direction of said electric field.

10. Electrophoresis apparatus comprising: three juxtaposed vertical flow chambers separated by right porous walls made of a non-conductive material which is permeable to flow therethrough of ionic current but which prevents bulk flow therethrough, the outermost flow chambers having oppositely polarized vertical plates of electrically conductive material comprising electrodes providing a transverse electric field therebetween, said vertical plates constituting essentially the outermost walls of each of said outermost flow chambers, gas trap-forming wall means at the top of the outermost flow chambers which wall means extend across the chambers in spaced parallel relation to the associated electrodes to form gas-receiving pockets for trapping gases developed as a result of electrolysis at the surface of the associated electrodes, means communicating with the pockets at the tops of the outermost flow chambers for removing the gaseous products therein, feed means for feeding carrier liquid in a vertically upward direction through each of said chambers, the feed means associated with said outermost chambers including outlet conduits which communicate with the upper extremities thereof on the side of said gas trap-forming wall means remote from said gas-receiving pockets, duct means at the bottom of the central chamber for introducing vertically upwardly into the central chamber the mixture to be fractionated, and separate outlet means at the top of said central chamber for removing the separated mixture particles therefrom.

11. Electrophoresis apparatus comprising: a cell body having three juxtaposed vertical flow chambers separated by vertical walls made of material permeable to flow therethrough of ionic current but which inhibits bulk liquid flow therethrough, the outermost of said vertical flow chambers having outermost vertical side walls made of insulating material and vertical walls contiguous with and disposed inwardly of said outermost walls and made of an electrically conductive material forming cell electrodes for establishing a horizontal electric field therebetween, a vertically extending inlet feed duct centered within the bottom of the central flow chambers, said inlet feed duct having a horizontally elongated mouth spaced from the walls of said central chamber, the longitudinal axis of the duct mouth being normal to a line extending between said electrodes, means for feeding a mixture of charged particles to be separated into the bottom of said inlet feed duct and upwardly vertically within said central flow chamber, means for feeding carrier liquid upwardly vertically within said central chamber into the space surrounding said inlet feed duct and also upwardly vertically into the bottoms of the outermost vertical flow chambers, an assembly of juxtaposed outlet ducts mounted in the upper end of said central flow chamber, said outlet ducts being spaced from one another in a direction parallel to a line between said electrodes, each of said outlet ducts being formed by a pair of spaced coplanar duct-forming plates having spaced downwardly diverging confronting edges at the lower portions thereof defining an upwardly converging lower duct passage section whose mouth is horizontally elongated in a direction normal to said electric field, and closely spaced confronting edges at the upper portions thereof forming an upper narrow duct passage section, the upper duct passage sections of the outlet ducts extending at various angles to separate the ends of the duct passages, each of said pairs of duct plates being sandwiched between plates closing off the sides of said duct passage sections, means for removing carrier liquid from the tops of said outermost chambers, and means for removing the carrier liquid and separated particles passing through said outlet ducts.

12. Electrophoresis apparatus comprising: a cell body having three juxtaposed vertical flow chambers separated by rigid, porous vertical walls made of insulating material permeable to flow therethrough of ionic current but which inhibits bulk liquid flow therethrough, the outermost of said vertical flow chambers having outermost vertical side walls made of insulating material and vertical walls contiguous with and disposed inwardly of said outermost walls and made of an electrically conductive material forming cell electrodes for establishing a horizontal electric field therebetween, a vertically extending inlet feed duct centered within the bottom of the central flow chamber, said inlet feed duct having a horizontally elongated mouth spaced substantially from the walls of said central chamber, the longitudinal axis of the duct mouth being normal to a line extending between said electrodes, means for feeding a mixture of charged particles to be separated into the bottom of said inlet feed duct and upwardly vertically within said central flow chamber, means for feeding carrier liquid upwardly vertically within said central flow chamber into the space surrounding said inlet feed duct and also upwardly vertically into the bottoms of the outermost vertical flow chambers, an assembly of juxtaposed outlet ducts mounted in the upper end of said central flow chamber, said outlet ducts being spaced from one another in a direction parallel to a line between said electrodes, each of said outlet ducts being formed by a pair of spaced coplanar duct-forming plates having spaced downwardly diverging confronting edges at the lower portions thereof defining an upwardly converging lower duct passage section whose mouth is horizontally elongated in a direction normal to said electric field, and closely spaced confronting edges at the upper portions thereof forming an upper narrow duct passage section, the upper duct passage sections of the outlet ducts extending at various angles to separate the ends of the duct passages, each of said pairs of duct plates being sandwiched between knife-edged plates closing off the sides of said duct passage sections, means for removing carrier liquid from the tops of said outermost chambers, and means for removing the carrier liquid and separated particles passing through said outlet ducts.

13. Electrophoresis apparatus comprising: a cell body having three juxtaposed vertical flow chambers separated by vertical walls made of material which is permeable to flow therethrough of ionic current but which inhibits bulk liquid flow therethrough, the outermost of said vertical flow chambers having outermost vertical side walls made of insulating material and vertical walls contiguous with and disposed inwardly of said outermost walls and made of an electrically conductive material forming cell electrodes for establishing a horizontal electric field therebetween, said cell body having a hollow bottom end section extending below said outermost flow chamber and forming a continuation of the central vertical flow chamber and an upper hollow end section extending above said outermost flow chamber and forming a continuation of the upper end of said central flow chamber, a vertically extending inlet feed duct centered within said hollow bottom end section, said inlet feed duct having a horizontally elongated mouth spaced substantially from the walls of said bottom end section, the longitudinal axis of the duct mouth being normal to a line extending between said electrodes, means for feeding a mixture of charged particles to be separated into the bottom of said inlet duct and upwardly vertically within said central flow chamber, means for feeding carrier liquid upwardly vertically within said central flow chamber into the space surrounding said inlet feed duct within said bottom end section and also upwardly vertically into the bottoms of the outermost of said vertical flow chambers, an outlet duct assembly mounted in said upper end section, said outlet duct assembly having a series of downwardly facing, horizontally elongated outlet duct mouths spaced from one another in a direction parallel to a line between said electrodes, the longitudinal dimension of each of said duct mouths being normal to the latter line, means for removing carrier liquid from the tops of said outermost chambers, and means for removing the carrier liquid and separated particles passing through said outlet ducts.

14. Electrophoresis apparatus comprising: a cell body having three juxtaposed vertical flow chambers separated by vertical walls made of material which is permeable to flow therethrough of ionic current but which inhibits bulk liquid flow therethrough, the outermost of said vertical flow chambers having outermost vertical side walls made of insulating material and vertical walls contiguous with and disposed inwardly of said outermost walls and made of an electrically conductive material forming cell electrodes for establishing a horizontal electric field therebetween, a vertically extending inlet feed duct centered within one end of the central flow chamber, said inlet feed duct being formed by a pair of spaced plates having closely spaced confronting edges at the inlet end thereof forming a narrow inlet duct passage section and spaced confronting edges at the outlet end thereof diverging toward the outlet end of the duct to form a flaring outlet duct passage section having a horizontally elongated duct mouth whose long dimension is normal to a line extending between said electrodes, said spaced duct plates being sandwiched between knife-edged plates closing off the sides of charged particles to be separated into the inlet end of said inlet feed duct passage, means for feeding carrier liquid upwardly vertically into the inlet end of said central flow chamber in the space surrounding said inlet feed duct and also upwardly vertically in the corresponding ends of the outermost of said vertical flow chambers, an outlet duct assembly mounted in the outlet end of said central flow chamber, said outlet duct assembly providing a series of horizontally elongated duct mouths facing toward the inlet feed duct and spaced from one another in a direction parallel to a line between said electrodes, the longitudinal dimension of each of said duct mouths being normal to the latter line, means for removing carrier liquid from the outlet ends of said outermost chambers, and means for removing the carrier liquid and separated particles passing through said outlet duct assembly.

15. Electrophoresis apparatus comprising: a cell body having three juxtaposed vertical flow chambers separated by vertical walls made of material which is permeable to flow therethrough of ionic current but which inhibits bulk liquid flow therethrough, the outermost of said vertical flow chambers having outermost vertical side walls made of insulating material and vertical walls contiguous with and disposed inwardly of said outermost walls and made of an electrically conductive material forming cell electrodes for establishing a horizontal electric field therebetween, a vertically extending inlet feed duct centered within the bottom of the central flow chamber, said inlet feed duct being formed by a pair of spaced plates having closely spaced confronting edges at the lower portions thereof forming a narrow inlet duct passage section and upwardly diverging spaced confronting edges at the upper portions thereof forming an upwardly flaring outlet duct section having a horizontally elongated duct mouth whose long dimension is normal to a line extending between said electrodes, spiralled strips of material extending between said diverging edges of said plates, said spaced duct plates being sandwiched between knife-edged plates closing off the sides of said duct passage sections, a pair of axially spaced fine mesh screens surrounding said inlet feed duct in an annular space between the duct and the walls of said central chamber, means for feeding a mixture of charged particles to be separated into the bottom of said inlet duct passage section and upwardly vertically within said central flow chamber, means for feeding carrier liquid upwardly vertically within and into the bottom of the central flow chamber in the space surrounding said inlet feed duct and also upwardly vertically into the bottoms of the outermost of said vertical flow chambers, an outlet duct assembly mounted in the upper end of said central flow chamber, said outlet duct assembly having a series of downwardly facing, horizontally elongated duct mouths spaced from one another in a direction parallel to a line between said electrodes, the longitudinal dimension of each of said duct mouths being normal to the latter line, means for removing carrier liquid from the tops of said outermost chambers, and means for removing the carrier liquid and separated particles passing through the tops of said outlet ducts.

16. Electrophoresis apparatus comprising: a cell body having three juxtaposed vertical flow chambers separated by rigid, porous vertical walls made of insulating material which is permeable to flow therethrough of ionic current but which inhibits bulk liquid flow therethrough, the outermost of said vertical flow chambers having outermost vertical side walls made of insulating material and vertical walls contiguous with and disposed inwardly of said outermost walls and made of an electrically conductive material forming cell electrodes for establishing a horizontal electric field therebetween, a vertically extending inlet feed duct centered within the bottom of the central flow chamber, said inlet feed duct being formed by a pair of spaced plates having closely spaced confronting edges at the lower portions thereof forming a narrow inlet duct passage section and upwardly diverging spaced confronting edges at the upper portions thereof forming an upwardly flaring outlet duct passage section having a horizontally elongated duct mouth whose long dimension is normal to a line extending between said electrodes, grooves formed in said upwardly diverging confronting edges of said plates, spiralled strips of material anchored in said grooves and extending between said diverging edges of said plates, said spaced duct plates being sandwiched between knife-edged plates closing off the sides of said duct passage sections, a pair of axially spaced fine mesh screens surrounding said inlet feed duct in an annular space between the duct and the walls of said central flow chamber, means for feeding a mixture of charged particles to be separated into the bottom of said inlet duct passage section and upwardly vertically within said central flow chamber, means for feeding carrier liquid upwardly vertically within and into the bottom of said central flow chamber in the space surrounding said inlet feed duct and also upwardly vertically into the bottoms of the outermost of said vertical flow chambers, an assembly of juxtaposed outlet ducts mounted in the upper end of said central flow chamber, said outlet ducts being spaced from one another in a direction parallel to a line between said electrodes, each of said outlet ducts being defined by a pair of spaced coplanar duct-forming plates having spaced downwardly diverging confronting edges at the bottom portions thereof defining an upwardly converging lower duct passage section whose mouth is horizontally elongated in a direction normal to said electric field, and closely spaced confronting edges at the upper portions thereof forming an upper narrow duct passage section, the upper duct passage sections of the feed ducts extending at various angles to separate the upper ends of the duct passages, each of said pairs of duct plates being sandwiched between knife-edged plates closing off the sides of said duct passage sections, means for removing carrier liquid from the tops of said outermost chambers, and means for removing the carrier liquid and separated particles passing through the tops of said outlet ducts.

17. Electrophoresis apparatus comprising: a cell body having three juxtaposed vertical flow chambers separated by vertical walls made of material which is permeable to flow therethrough of ionic current but which inhibits bulk liquid flow therethrough, the outermost of said vertical flow chambers having oppositely polarized vertical plates of electrically conductive material comprising electrodes for establishing a horizontal electric field therebetween, said vertical plates constituting essentially the outermost walls of each of said outermost flow chambers, a vertically extending inlet feed duct centered within the bottom of the central flow chamber, said inlet feed duct being formed by a pair of spaced plates having closely spaced confronting edges at the lower portions thereof forming a narrow inlet duct passage section and upwardly diverging spaced confronting edges at the upper portions thereof forming an upwardly flaring outlet duct passage section having a horizontally elongated duct mouth whose long dimension is normal to a line extending between said electrodes, said spaced duct plates being sandwiched between knife-edged plates closing off the sides of said duct passage sections, means for feeding a mixture of charged particles to be separated into the bottom of said inlet duct passage section and upwardly vertically within said central flow chamber, means feeding carrier liquid upwardly vertically within and into the bottom of said central flow chamber in the space surrounding said inlet feed duct and also upwardly vertically into the bottoms of the outermost of said vertical flow chambers, an outlet duct assembly mounted in the upper end of said central flow chamber, said outlet duct assembly providing a series of downwardly facing, horizontally elongated duct mouths spaced from one another in a direction parallel to a line between said electrodes, the longitudinal dimensions of each of said duct mouths being normal to the latter line, means for removing carrier liquid from the tops of said outermost chambers, and means for removing the carrier liquid and separated particles passing through the tops of said outlet ducts.

References Cited in the file of this patent
UNITED STATES PATENTS

| | | |
|---|---|---|
| 1,306,237 | Townsend | June 10, 1919 |
| 2,555,487 | Haugaard et al. | June 5, 1951 |
| 2,631,100 | Aten et al. | Mar. 10, 1953 |
| 2,758,966 | Raymond | Aug. 14, 1956 |
| 2,801,962 | Polson | Aug. 6, 1957 |
| 2,878,178 | Bier | Mar. 17, 1959 |

OTHER REFERENCES

Philpot, J.: Transactions of the Faraday Society, vol. 36, pages 38–46, 1940.